United States Patent [19]
Harris et al.

[11] 3,738,205
[45] June 12, 1973

[54] SELF-CENTERING TURNTABLE FOR MACHINING LARGE CIRCULAR OBJECTS

[75] Inventors: Arthur Winslow Harris, Germantown; Robert Louis Adkins, Memphis, both of Tenn.

[73] Assignee: Chicago Bridge & Iron Company, Oak Brook, Ill.

[22] Filed: May 18, 1971

[21] Appl. No.: 144,484

[52] U.S. Cl. .................................. 82/4 R, 82/2 D
[51] Int. Cl. ......................... B23b 3/22, B23b 3/00
[58] Field of Search .................. 82/2, 2 D, 4, 2.5

[56] References Cited
UNITED STATES PATENTS

| | | | |
|---|---|---|---|
| 3,260,140 | 7/1966 | Burge | 82/2 D |
| 3,430,389 | 3/1969 | Overdeck | 82/2 D |
| 3,057,234 | 10/1962 | Heer | 82/2 D |

*Primary Examiner*—Harrison L. Hinson
*Attorney*—Merriam, Marshall, Shapiro & Klose

[57] ABSTRACT

A large diameter self-centering turntable for field machining having an approximately circular horizontal track, a plurality of wheels riding on and spaced about the track, each wheel being mounted on an axle horizontal to the track and radial to the circle described by the track, with each wheel being axially displaceable on its axle for a predetermined distance to accommodate out of roundness of the circular track, a bearing support holding bearing means for each axle, a circular ring, means mounting the circular ring horizontally on the bearing supports, and a drive for rotating the circular ring around the track on the wheels.

10 Claims, 7 Drawing Figures

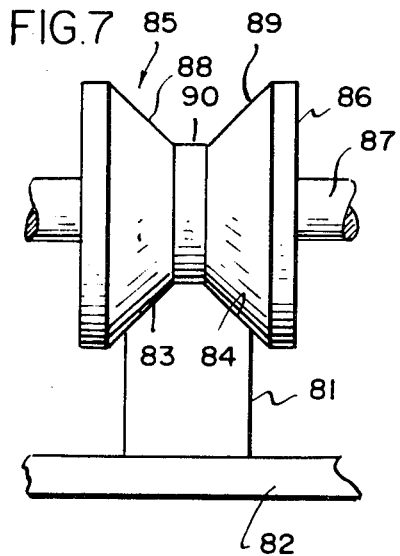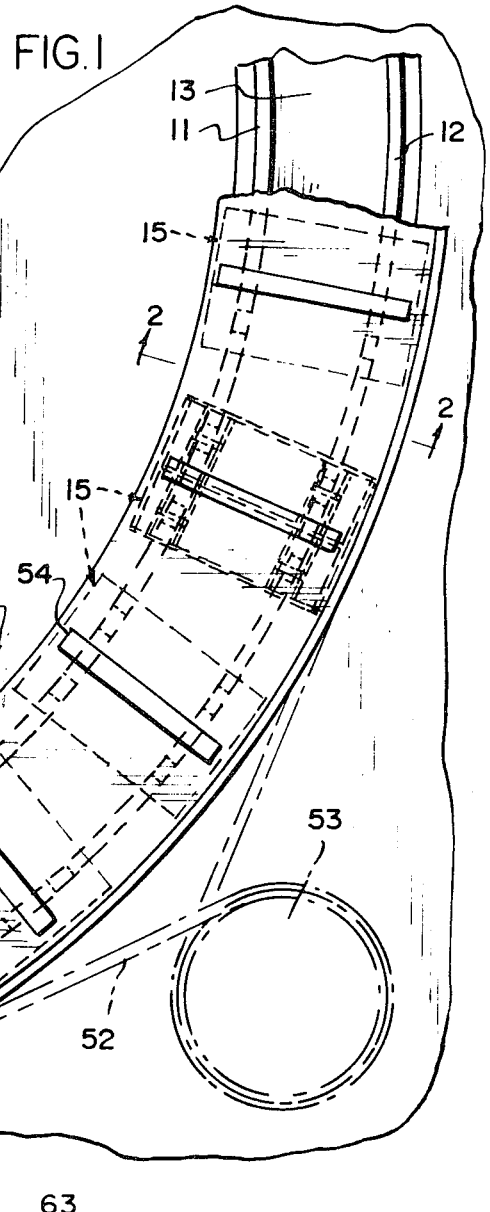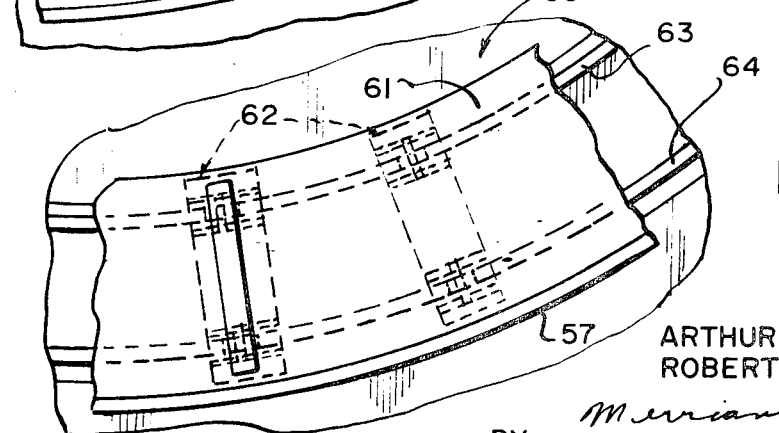
INVENTORS.
ARTHUR WINSLOW HARRIS
ROBERT LOUIS ADKINS
BY Merriam, Marshall, Shapiro & Klose
ATTORNEYS.

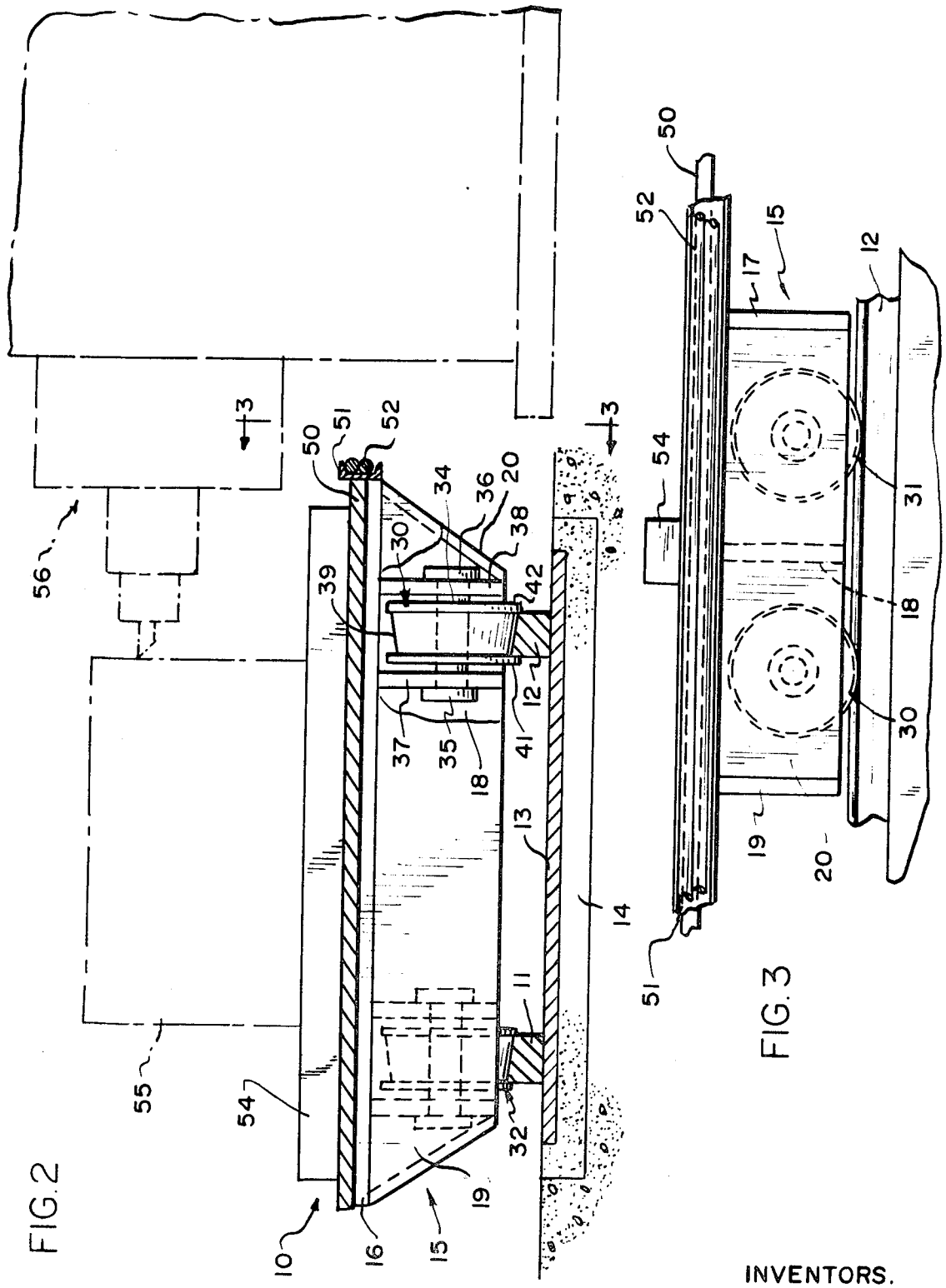

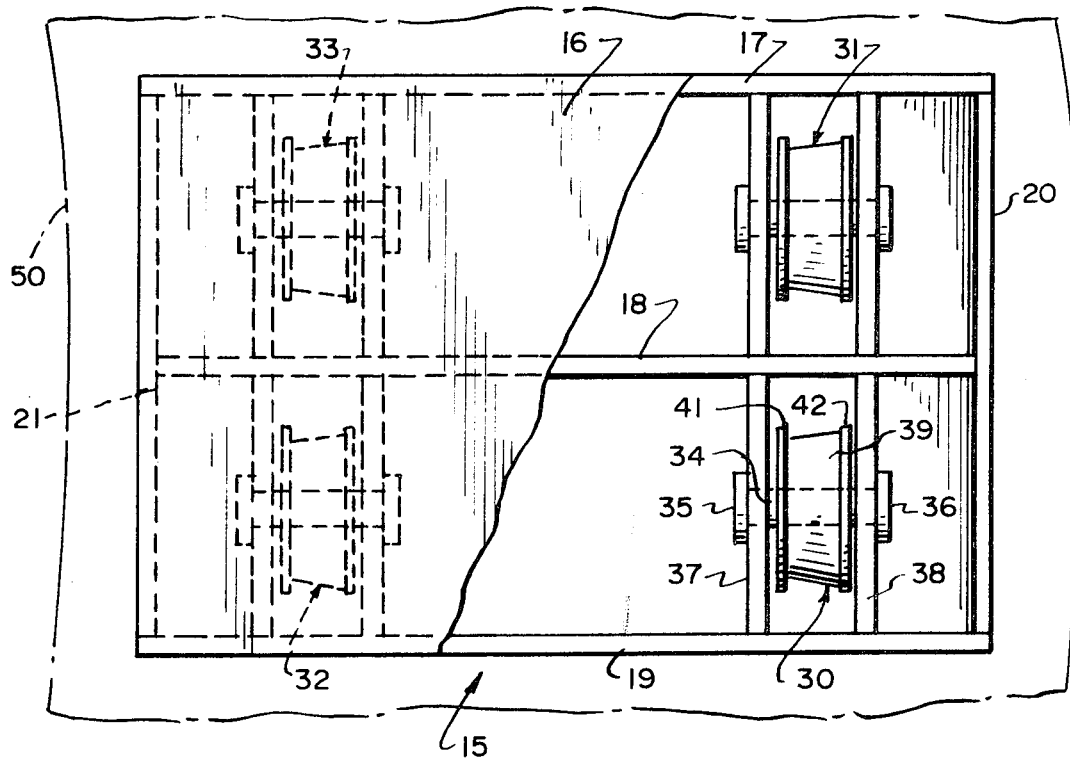
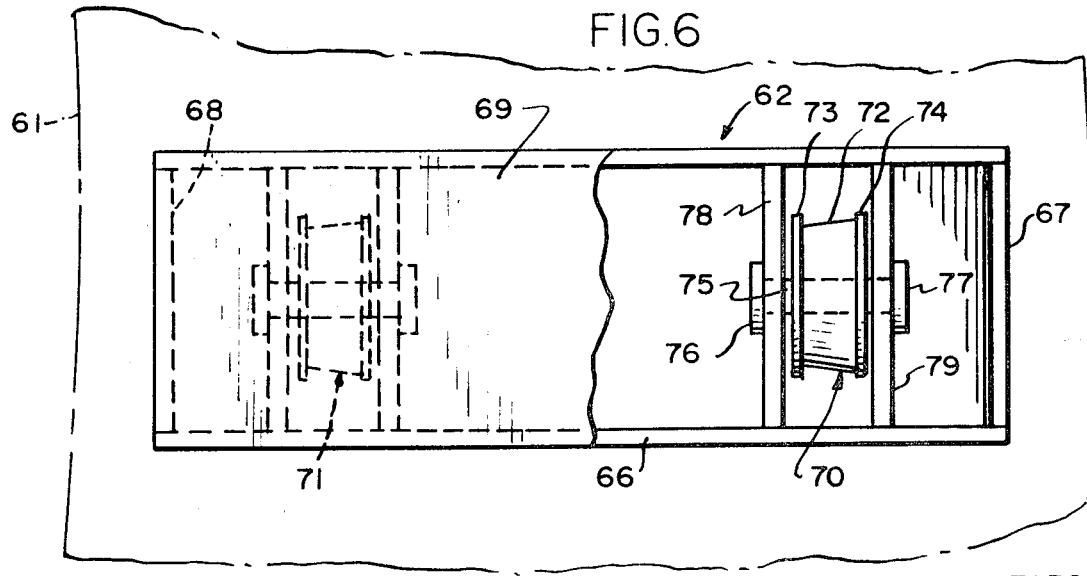

SELF-CENTERING TURNTABLE FOR MACHINING LARGE CIRCULAR OBJECTS

This invention relates to tools and equipment for machining objects. More particularly, this invention is concerned with the machining of large objects in the field and equipment therefor.

The fabrication and construction of many reactors and vessels used industrially requires that various parts and elements be machined to close tolerances to obtain a proper fit. Usually such machining is done in a plant. However, because of the large size of many reactors and vessels now being built or contemplated, it is often not feasible to do the necessary machining in a plant. The size of many parts requires that they be shipped in pieces and the pieces assembled at the construction site. Parts fabricated from pieces at the site generally do not possess the dimensional accuracy needed to meet specifications so it is essential that they be field machined to the proper size. In addition, many parts fabricated on site must be stress relieved by a suitable heat treatment and this often results in warping and twisting of metal objects which must thereafter be machined to suitable size and shape.

Many of the parts fabricated on site are of a circular nature or have circular or cylindrical surfaces which must be dimensionally accurate to close tolerances to meet specifications. To machine such parts, either the cutting tool must rotate with the part stationary, or the part must rotate and the tool must be stationary. Very seldom is it advantageous for both the tool and the part to rotate simultaneously. For machining many field fabricated parts, it is often advantageous to rotate the part and to hold the cutting tool stationary. However, for this approach to be successful there is a need for apparatus which will accurately rotate the part about a center so that precise machining of the part can be achieved. In addition, the apparatus must be rugged and be capable of supporting extremely heavy parts such as of 50 tons or more.

There is provided by the subject invention a self-centering turntable upon which a piece, part or object to be machined can be supported and rotated with dimensional accuracy. The turntable, when used in conjunction with a tool holder, constitutes a novel machine tool especially adapted for on site circular machining of large heavy metal parts.

In a broad embodiment, the self-centering turntable comprises an approximately circular large diameter horizontal track mounted on a base, a plurality of wheels riding on and spaced about the track with each wheel being mounted on an axle horizontal to the track and radial to the circle described by the track, with each wheel being axially displaceable on its axle for a predetermined distance to accommodate out of roundness of the circular track, a bearing support for each axle, a circular ring, means mounting the circular ring horizontally on the bearing supports, and drive means for rotating the circular ring on the wheels around the track. The drive means can comprise a channel around the outer periphery of the circular ring and an endless cable positioned in the channel and communicating with a power driven pulley. Other drive means can be used. A gear box and pinion can drive a large circular gear rack attached at a suitable place to the turntable. The bearing supports of two or more wheels can be joined to a common frame member and the frame member can be detachable from the circular ring. The track can consist of one circular rail, or two or more approximately concentric spaced apart circular rails.

In a more specific embodiment of the invention, the turntable has a pair of approximately circular concentric spaced apart horizontal rails mounted on a base, a plurality of spaced apart four wheel trucks riding on the rails with two wheels of each truck riding on each rail, each wheel being mounted on an axle horizontal to the rails and radial to the concentric rails, with each wheel being axially displaceable on its axle for a predetermined distance to accommodate out of roundness of the rails, a circular ring horizontally mounted on the trucks and drive means for rotating the circular ring around the rails on the trucks. One-half of the wheels of each truck ride on each rail. The wheels are advisably double flanged to keep them from moving off the rails. Also, each rail top surface is advisably sloped radially upwardly towards the center of the circle described by the rail and the wheels have correspondingly sloped rims.

A turntable, as described, in combination with a tool holder placed on a base inside or outside of the circular ring constitutes a machine tool for circular machining of a part or object supported on and rotated by the turntable.

The novel turntable of this invention is self-centering and permits accurate machining even though the track or rails are out of round or not exactly circular. The ability of the wheels to move axially on their axles permits accommodation by the wheels of radial irregularities or noncircularity of the tracks or rails while the circular ring and any part supported thereby rotates in a circle about a point even though the circular ring is devoid of arms connecting it to a pivot shaft at such point. The track or rails however must be supported level or horizontal to obtain accurate horizontal cuts. After use of the turntable has been completed at a construction site, it can be disassembled and stored for reuse at a different location.

The invention will now be described further in conjunction with the attached drawings in which:

FIG. 1 is a plan view of part of one embodiment of a turntable for field machining provided by this invention;

FIG. 2 is a side elevational view, partly in section and partly broken away, taken along the line 2—2 of the turntable of FIG. 1;

FIG. 3 is a front or end elevational view taken along the line 3—3 of the turntable of FIG. 2;

FIG. 4 is a plan view, partly broken away, of the four-wheeled truck shown in the turntable of FIGS. 2 and 3;

FIG. 5 is a partial plan view of another embodiment of a turntable which employs a plurality of two-wheeled trucks;

FIG. 6 is a plan view, partly broken away, of a two-wheel truck used in the turntable embodiment of FIG. 5; and FIG. 7 is an elevational view of another type of wheel and track combination which can be used in the turntable.

So far as is practical, the same elements or parts which appear in the different views of the drawings will be identified by the same number.

With reference to the drawings, FIGS. 1 to 4 illustrate one embodiment of the turntable provided by this invention for use in field machining a piece in combination with a tool holder. The turntable 10 has a pair of concentrically positioned circular rails 11 and 12 spaced apart from each other and held in position by a tie plate 13 on supporting foundation 14. Each of rails 11 and 12 is advisably identical in construction. The rails are placed horizontally and the horizontal or top face of each is carefully leveled or adjusted, and advisably machined, so that subsequent machining of a piece of the turntable will be in a plane horizontal to the object. The rails are of a large diameter such as of 50 to 100 feet or more and, because of the difficulty involved in producing rails in the form of an exact circle of large diameter, they are only formed to reasonably approximate circles. Any non-circular portions of the rails is readily accommodated for by the novel wheel supporting means used in the turntable.

A plurality of four-wheeled trucks 15 are mounted on the pair of approximately circular rails 11 and 12. Each of the trucks 15 has a top plate or bed 16 joined to a supporting framework of vertically positioned spaced apart parallel plates 17, 18 and 19 and end plates 20 and 21. The framework has means to support four wheels, advisably of the same size and shape. As shown in FIG. 4, wheels 30, 31, 32 and 33, of identical size and shape, are so positioned that a pair of the wheels rolls on one rail and the other pair of wheels rolls on the second rail. Thus, wheels 30 and 31 roll on rail 12 and wheels 32 and 33 roll on rail 11. Each of the wheels is supported in a similar way by the truck framework so the description of the details of such structure will be limited to wheel 30 and its supporting elements.

Wheel 30 is adapted to roll on axle 34 which is supported at its ends by bearings 35 and 36. Each of bearings 35 and 36 is held in place by a vertically positioned plate. Thus, plate 37 supports bearing 35 and plate 38 supports bearing 36. The space between plates 37 and 38 is considerably greater than the thickness or width of wheel 30 to provide space for the wheel to slide axially on the axle, which is in stationary position, to thereby accommodate any non-circularity or out of roundness in rail 12. Wheels 31, 32 and 33 are mounted in the same way for the same purpose. Each wheel has its axle positioned horizontal to the tracks and radial to the circle described by the tracks. It is also within the invention to fix the wheel in position on the axle and to have the axle slide axially in the bearings.

Rim 39 of wheel 30 is advisably sloped radially upwardly toward the center of the circle described by the rail. Each rail is also advisably sloped at an angle to complement the slope of the wheel rim. The angle of slope is readily correlated with the particular diameter of the rails employed as part of the turntable. For any angle of rotation of the turntable, the inner edge of the wheel will rotate a shorter absolute distance than the outer edge of the wheel since the outer edge rotates about a greater radius. Accordingly, to avoid sliding movement between the wheel rim and the rail, the sloped or angled rim is provided to have surfaces which can accommodate the different radial distances through which the wheel rim must travel on the circular rails. The wheel rims and rails are thus sloped for the same reason that conical roller bearings are used as thrust bearings on the end of a shaft. Wheel 30 is provided with flanges 41 and 42 to keep the wheel on the track, as are the other wheels 31, 32 and 33.

A plurality of trucks 15 are mounted on rails 11 and 12. Ring 50, advisably made of a metal plate, is positioned on top of such trucks. The external peripheral edge of ring 50 is provided with a circular channel member 51 in which one or more cables 52 can be positioned. Cables 52 extend completely around the rim and are looped about power driven pulley 53 to rotate the turntable when the pulley is activated.

Magnets 54 can be positioned on top of ring 50 in spaced apart position. The magnets secure circular workpiece 55 in position so that tool holder 56, shown schematically, can machine it. Tool holder 56 is shown mounted in fixed position on a suitable support outside of the turntable. It can also, however, be mounted on the inside of the turntable. When the tool holder is placed on the inside of the turntable, it can be mounted securely in place on a foundation since no rotating arms or spokes are needed or used to achieve accurate circular rotation of the turntable. No fixed pivot shaft is employed to guide the turntable in its accurate circular path. In other words, the turntable provided herewith is not like a wheel since this turntable has no central hub or spokes extending radially therefrom.

Use of magnets 54 is not essential to the invention. Other means may be employed to secure workpiece 55 onto ring 50. Thus, the workpiece may be temporarily welded thereto or held in place by bolted clamps.

FIGS. 5 and 6 illustrate another embodiment of a turntable provided by this invention for use in combination with a tool holder to machine large circular objects in the field. The turntable 60, as shown in part in FIG. 5, comprises a flat horizontal ring 61 supported by a plurality of two-wheeled trucks 62 which ride on rails 63 and 64. Ring 61 has a circular channel member 57 on its outer peripheral edge similar to channel member 51 shown in FIGS. 1 to 4. Cables are placed in channel member 57 to drive the turntable in the same manner as previously described with regard to the turntable shown in FIG. 1.

With reference to FIG. 6, the two-wheeled truck 62 framework comprises opposing vertical side plates 65 and 66 connected at their ends to vertical end plates 67 and 68. Top plate or bed plate 69 rests on and is joined to the truck framework. Wheel 70 is positioned at one end of the truck framework and wheel 71 at the other end of the framework. Each wheel is of identical size and the supporting axles and bearings for each is identical so such elements will be described only in conjunction with one of the wheels.

Wheel 70 has a sloped rim 72 which rides on the top sloped surface of rail 64. To keep wheel 72 from riding off the track it is provided with flanges 73 and 74 on the wheel rim edges. Axle 75 rotatably supports wheel 70. The ends of axle 75 are mounted in bearings 76 and 77. Bearing 76 is mounted in vertical plate 78 and bearing 77 is mounted in vertical plate 79. Plates 78 and 79 are positioned parallel to one another in spaced apart relationship. The distance between these plates is considerably greater than the thickness of wheel 70 so that the wheel can not only rotate on axle 75 but also slide axially thereto to accommodate any noncircularity or out of roundness of rail 64 on which it rides. Axle 75 is located horizontal to track 64 and radial to the circle described by it.

Although a two-wheeled truck can be employed as shown in FIGS. 5 and 6, its use requires that it be stabilized in upright position during assembly of the turntable in the field. Since a large number of wheeled trucks are employed for the turntable, it can be seen that stabilizing such trucks until the circular ring can be mounted on the trucks requires care and labor. It is accordingly generally advisable to employ trucks which have at least three wheels in order for the trucks to be self-stabilizing on a pair of tracks with, of course, one wheel on one track and two wheels on the other track.

While it is possible to employ trucks which have a single wheel and to mount them to rotate on a single circular rail, this would be laborious since all of the wheels would have to be held in correct position during mounting of the circular ring to be used for supporting an object to be machined. Nevertheless such structures can be used and it is accordingly within the scope of this invention to use a single circular track with a plurality of singular or separate wheels mounted thereon, in spaced apart relationship to each other, and supporting a circular ring for holding a workpiece. Such a structure when revolved for machining operations is self-centering and no pivot shaft or other guide means is required to obtain accurate circular rotation.

It is also within the scope of the invention to more or less permanently mount the wheels in a circle beneath a circular ring workpiece support for rotation on a single circular rail.

While it is advisable to employ rails with sloped top surfaces and wheels with sloped rims, this is not essential to operation of the turntable. A suitable turntable is obtained by using flat-topped rails and wheels with rims having surfaces of cylindrical shape rather than conical shape.

FIG. 7 illustrates another combination of wheel-track structure which can be used in the turntable. Track 81 is supported on base 82. The upper longitudinal edges 83 and 84 of the track are equally beveled to provide a wheel contacting surface which fits into groove 85 in wheel 86 supported on axle 87. The groove 85 is defined by inwardly sloping sides 88 and 89 which terminate in the flat valley 90. Such a wheel-track combination is useful since it prevents the wheel from rolling off of the track during axial movement of the wheel along the axle.

The foregoing detailed description has been given for clearness of understanding only, and no unnecessary limitations should be understood therefrom, as modifications will be obvious to those skilled in the art.

What is claimed is:

1. A large diameter self-centering turntable for field machining comprising:
    a pair of approximately circular concentric spaced apart horizontal rails mounted on a base;
    a plurality of spaced apart four wheel trucks riding on the rails with two wheels of each truck riding on each rail;
    each wheel being mounted on an axle horizontal to the rails and radial to the concentric rails with each wheel being axially displaceable on its axle for a predetermined distance to accommodate out of roundness of the rails;
    a circular ring horizontally mounted on the trucks; and
    drive means for rotating the circular ring around the rails and the trucks.

2. A turntable according to claim 1 in which the wheels are double flanged to keep them from moving off the rails.

3. A turntable according to claim 1 in which each rail top surface is sloped radially upwardly toward the center of the circle described by the rail and the wheels have correspondingly sloped rims.

4. A machine tool for machining a large object in the field comprising, in combination:
    a tool holder; and
    a large diameter self-centering turntable for supporting and rotating relative to the tool holder an object to be machined thereon by a tool in the tool holder;
    said turntable comprising a pair of approximately circular concentric spaced apart horizontal rails mounted on a base;
    a plurality of spaced apart four wheel trucks riding on the rails with two wheels of each truck riding on each rail;
    each wheel being mounted on an axle horizontal to the rails and radial to the concentric rails with each wheel being axially displaceable on its axle for a predetermined distance to accommodate out of roundness of the rails;
    a circular ring horizontally mounted on the trucks to support an object to be machined; and
    drive means for rotating the circular ring around the rails on the trucks.

5. A machine tool according to claim 4 in which each rail top surface is sloped radially downwardly toward the center of the circle described by the rail and the wheels have correspondingly sloped rims, and said wheels each is double flanged to prevent the wheel from rolling off the rail.

6. A machine tool according to claim 4 in which each truck has two wheels on each rail.

7. A turntable according to claim 4 in which the wheels have grooves and the track fits into the grooves.

8. A large diameter self-centering turntable for field machining comprising:
    an approximately circular horizontal track mounted on a base;
    a plurality of wheels riding on and spaced about the track;
    each wheel being mounted on an axle horizontal to the track and radial to the circle described by the track, with each wheel being axially displaceable on its axle for a predetermined distance to accommodate out of roundness of the circular track;
    a bearing support holding bearing means for each axle;
    a circular ring;
    means mounting the circular ring horizontally on the bearing supports;
    at least the bearing supports of two wheels being joined to a common frame member and the frame member is detachable from the circular ring; and
    drive means for rotating the circular ring around the track on the wheels.

9. A large diameter self-centering turntable for field machining comprising:
    an approximately circular horizontal track consisting of two circular spaced apart approximately concentric rails mounted on a base;
    a plurality of wheels riding on and spaced about the track with approximately one-half of the wheels riding on each rail;
    each wheel being mounted on an axle horizontal to the rail on which it rides and radial to the circle described by the rail, with each wheel being axially displaceable on its axle for a predetermined distance to accommodate out of roundness of the circular rail on which it rides;

a bearing support holding bearing means for each axle;

a circular ring;

means mounting the circular ring horizontally on the bearing supports; and drive means for rotating the circular ring around the track on the wheels.

10. A machine tool for machining a large object in the field comprising, in combination:

a tool holder; and a large diameter self-centering turntable for supporting and rotating relative to the tool and object to be machined therein by a tool in the tool holder; said turntable comprising:

an approximately circular horizontal track mounted on a base;

a plurality of wheels riding on and spaced about the track;

each wheel being mounted on an axle horizontal to the track and radial to the circle described by the track, with each wheel being axially displaceable on its axle for a predetermined distance to accommodate out of roundness of the circular track;

a bearing support holding bearing means for each axle;

a circular ring;

means mounting the circular ring horizontally on the bearing supports to support an object to be machined;

at least the bearing supports of two wheels being joined to a common frame member and the frame member is detachable from the circular ring; and drive means for rotating the circular ring around the track on the wheels.

* * * * *